(12) United States Patent
Watanabe et al.

(10) Patent No.: US 9,885,418 B2
(45) Date of Patent: Feb. 6, 2018

(54) METAL GASKET

(71) Applicant: NOK CORPORATION, Tokyo (JP)

(72) Inventors: Takeshi Watanabe, Nihonmatsu (JP); Isao Tanji, Nihonmatsu (JP); Shinya Nakaoka, Makinohara (JP)

(73) Assignee: NOK Corporation (JP)

( * ) Notice: Subject to any disclaimer, the term of this patent is extended or adjusted under 35 U.S.C. 154(b) by 0 days.

(21) Appl. No.: 15/502,074

(22) PCT Filed: Jul. 15, 2015

(86) PCT No.: PCT/JP2015/070221
§ 371 (c)(1),
(2) Date: Feb. 6, 2017

(87) PCT Pub. No.: WO2016/021380
PCT Pub. Date: Feb. 11, 2016

(65) Prior Publication Data
US 2017/0227127 A1      Aug. 10, 2017

(30) Foreign Application Priority Data

Aug. 7, 2014   (JP) ................................ 2014-161160

(51) Int. Cl.
*F16J 15/08* (2006.01)
*F16J 15/10* (2006.01)

(52) U.S. Cl.
CPC ........... *F16J 15/0818* (2013.01); *F16J 15/10* (2013.01); *F16J 2015/0856* (2013.01)

(58) Field of Classification Search
CPC ... F16J 15/0818; F16J 15/0825; F16J 15/0831
USPC ................ 277/590, 591, 592, 593, 594, 595
See application file for complete search history.

(56) References Cited

U.S. PATENT DOCUMENTS

| 7,832,736 | B2 * | 11/2010 | Takahashi | .............. F16J 15/122 |
| | | | | 277/592 |
| 8,579,299 | B2 * | 11/2013 | Zhuang | .................. C09J 7/0217 |
| | | | | 277/594 |
| 2006/0163817 | A1 * | 7/2006 | Ishikawa | .............. F16J 15/0818 |
| | | | | 277/494 |

(Continued)

FOREIGN PATENT DOCUMENTS

| CN | 101408247 A | 4/2009 |
| CN | 102536506 A | 7/2012 |

(Continued)

*Primary Examiner* — Gilbert Y Lee
(74) *Attorney, Agent, or Firm* — Harness, Dickey & Pierce, P.L.C.

(57) ABSTRACT

In a tabular metal gasket having a plurality of bolt holes, a seal bead is provided between bolt holes which are adjacent to each other, one end of the seal bead is connected to the one bolt hole and the other end of the seal bead is connected to the other bolt hole. The seal bead is formed into a gradually changing shape in which a width is the narrowest at the center portion between the bolt holes and the width is gradually enlarged from the center portion between the bolt holes toward the bolt holes, and satisfies the following expression (a): D>d≥W1 in which D is a diameter of a head seat surface of a fastening bolt which is inserted into the bolt hole, d is a diameter of the bolt hole, and W1 is the maximum width of the seal bead.

6 Claims, 7 Drawing Sheets

(56) References Cited

U.S. PATENT DOCUMENTS

2009/0072493 A1* 3/2009 Duckek ................ F16J 15/0818
        277/593
2012/0153579 A1* 6/2012 Nakaoka .............. F16J 15/0818
        277/644

FOREIGN PATENT DOCUMENTS

| CN | 102575771 A | 7/2012 | |
|---|---|---|---|
| JP | S59-188351 A | 10/1984 | |
| JP | S62-155375 A | 7/1987 | |
| JP | S62-261755 A | 11/1987 | |
| JP | H01-136769 U | 9/1989 | |
| JP | H06-47772 U | 6/1994 | |
| JP | H07-006563 U | 1/1995 | |
| JP | H08-93918 A | 4/1996 | |
| JP | 2000-048835 A | 2/2000 | |
| JP | 2008-255975 A | 10/2008 | |
| JP | 2009097528 A * | 5/2009 | ........... F16J 15/0825 |

* cited by examiner

METAL GASKET

CROSS-REFERENCE TO RELATED APPLICATIONS

This application is a U.S. National Stage Application of International Application No. PCT/JP2015/070221, filed on Jul. 15, 2015, and published in Japanese as WO 2016/021380 A1 on Feb. 11, 2016. This application claims priority to Japanese Application No. 2014-161160, filed on Aug. 7, 2014. The entire disclosures of the above applications are incorporated herein by reference.

BACKGROUND OF THE INVENTION

Field of the Invention

The present invention relates to a metal gasket according to a sealing technology. The metal gasket according to the present invention is used, for example, in an automotive field or the other fields.

Description of the Conventional Art

In a tabular metal gasket, a seal bead has been conventionally formed on a flat surface thereof, and the tabular metal gasket has sealed internal pressure and water from an outer side by compressing the seal bead when being fastened by bolts. As well as a seal portion is brought into line contact by forming the seal bead, thereby increasing a sealing surface pressure, the seal bead is required for making the seal portion follow to the flatness of the other surface.

In recent years, it has been essential to downsize and weight save a flange in an engine, an auxiliary machine, and an inverter for an electric vehicle and a hybrid electric vehicle, for improving a fuel consumption of a vehicle such as a motor vehicle. In connection with this, the flange has been reduced its thickness, and the flange has been lowered its rigidity. As a result, even in a field of the metal gasket which is installed to the flange, there has been demanded provision of a gasket which can correspond to the low rigidity.

However, since the flange has the low rigidity, there is a case that the flange in the other side deforms when being fastened by the bolts (the flange is deformed even if the gasket is not assembled), an amount of compression of the seal bead comes short, and a sealing performance can not be obtained.

Further, in addition to the above, there is a case that the amount of compression or the seal bead comes short and the sealing performance can not be obtained since an amount of deformation of the flange becomes greater as a distance between the bolts (a distance between the fastening bolts) becomes longer.

On the other hand, there are inventions described in Japanese Unexamined Patent Publication No. 62-155375, Japanese Unexamined Patent Publication No. 59-188351 and Japanese Unexamined Patent Publication No. 8-93918 as the prior arts relating to the sealing performance between the fastening member such as the bolts and the metal gasket.

Further, there is a demand of addressing narrowness of the seal surface in addition to the above, and there is a case that a space applying the seal bead does not exist in the vicinity of the bolt hole.

However, none of the inventions described in the above patent documents 1 to 3 can meet the demand of addressing the narrowness of the seal surface.

Figure 10:
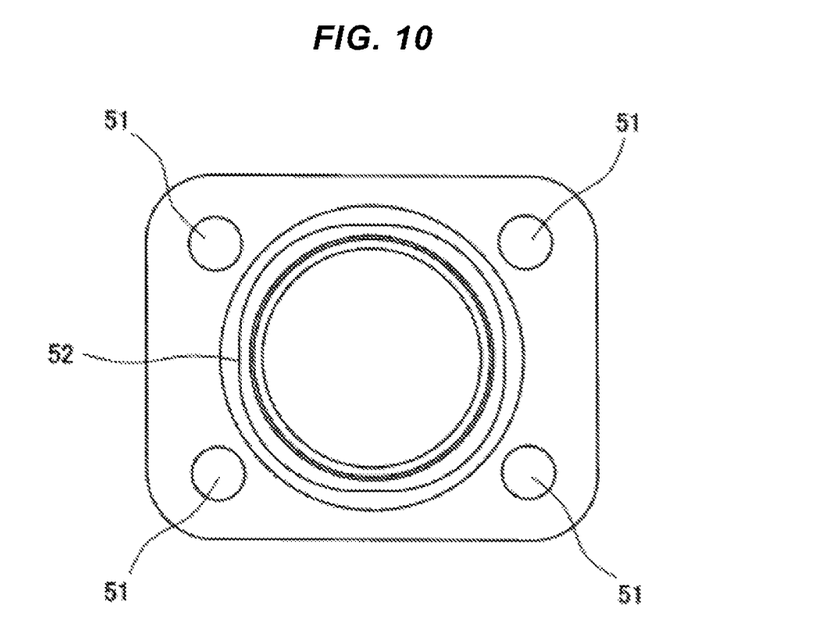
FIG. 10 is a plan view of a metal gasket according to the prior art.

More specifically, in the invention described in the patent document 1, since bolt holes 51 and a seal bead 52 are arranged at different positions on a plane as shown in FIG. 10, the invention can not respond to a request for narrowing a width of a seal surface.

Figure 11:
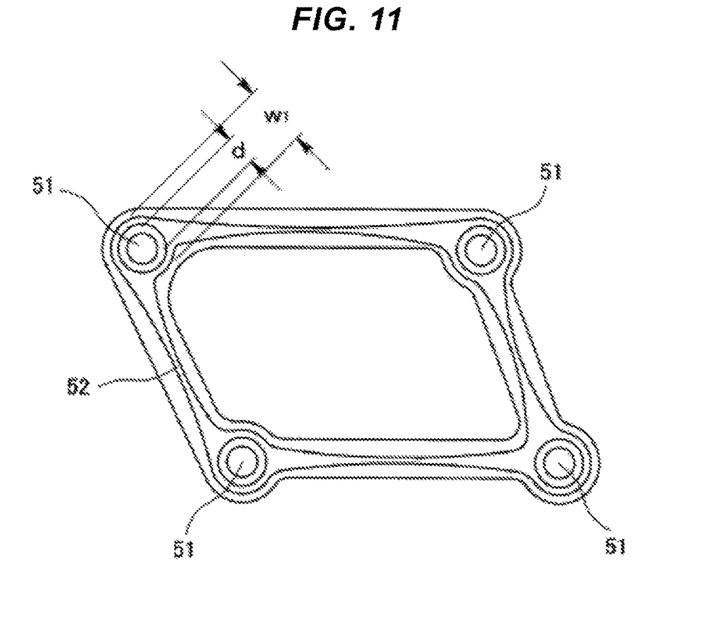
FIG. 11 is a plan view of a metal gasket according to the other prior art.

In the invention described in the patent document 2, a magnitude (a diameter d) of a bolt hole 51 is set to be approximately fixed regardless of a specification of a gasket as shown in FIG. 11. However, since a relationship of a maximum width W1 of a seal bead 52 in relation to the magnitude (the diameter d) of the bolt hole 51 is set to d<W1, the invention can not respond to the request for narrowing the width of the seal surface.

Figure 12:
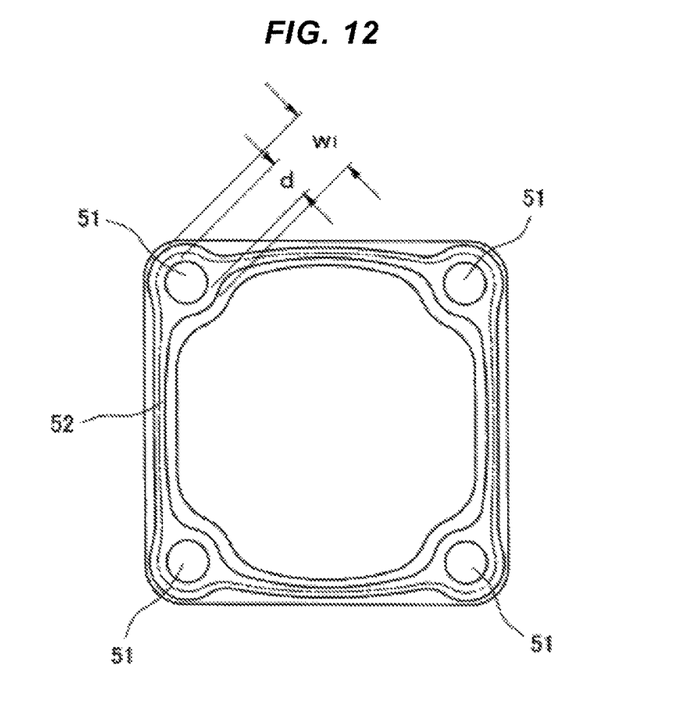
FIG. 12 is a plan view of a metal gasket according to the other prior art.

In the invention described in the patent document 3, a magnitude (a diameter d) of a bolt hole 51 is set to be approximately fixed regardless of a specification of a gasket in the same manner as shown in FIG. 12. However, since a relationship of a maximum width W1 of a seal bead 52 in relation to the magnitude (the diameter d) of the bolt hole 51 is set to d<W1, the invention can not respond to the request for narrowing the width of the seal surface.

SUMMARY OF THE INVENTION

Problem to be Solved by the Invention

The present invention is made by taking the above points into consideration, and an object of the present invention is to provide a metal gasket which has an excellent sealing performance even in a low rigidity flange and even if a distance between fastening members such as bolts is long, and can respond to the request for narrowing the width of the seal surface.

Means for Solving the Problem

In order to achieve the above object, a metal gasket according to a first aspect of the present invention is a metal gasket having a plurality of bolt holes and formed into a tabular shape, wherein a seal bead is provided between bolt holes which are adjacent to each other, one end of the seal bead is connected to the one bolt hole and the other end of the seal bead is connected to the other bolt hole, and the seal bead is formed into a gradually changing shape in which a width is the narrowest at the center portion between the bolt holes and the width is gradually enlarged from the center portion between the bolt holes toward the bolt holes, and satisfies the following expression (a):

$$D > d \geq W1 \qquad (a)$$

in which D is a diameter of a head seat surface of a fastening bolt which is inserted into the bolt hole, d is a diameter of the bolt hole, and W1 is the maximum width of the seal bead.

Further, a metal gasket according to a second aspect of the present invention is the metal gasket described in the first aspect mentioned above, wherein the seal bead is a half bead which is provided with an inclined surface portion, and the inclined surface portion and the bolt hole are provided at positions which are lapped over each other on a plane.

Further, a metal gasket according to a third aspect of the present invention is the metal gasket described in the first aspect mentioned above, wherein the seal bead is a full bead which is provided with a curved surface portion having a circular arc cross sectional shape, and the curved surface portion having the circular arc cross sectional shape and the bolt hole are provided at positions which are lapped over each other on a plane.

Moreover, a metal gasket according to a fourth aspect of the present invention is the metal gasket described in the first, second or third aspect mentioned above, wherein the metal gasket is a gasket which is constructed by a metal plate, or a gasket in which a rubber-like elastic body is attached to both surfaces or one surface in a thickness direction of a metal plate.

In the metal gasket according to the present invention having the structure mentioned above, the seal bead is provided between the bolt holes which are adjacent to each other, and the seal bead is connected in its one end to the one bolt hole and is connected in its other end to the other bolt hole, and is formed into the gradually changing shape in which the width is the narrowest at the center portion between the bolt holes and is gradually expanded from the center portion between the bolt holes toward the bolt holes. As a result, the seal bead is formed into such a shape that is most hard to be deformed at the center portion between the bolt holes, and is easy to be deformed gradually from the center portion between the bolt holes toward the bolt holes. Therefore, a comparatively great sealing surface pressure is generated in the center portion between the bolt holes which is hard to be deformed, when the bolt is fastened.

Further, the relationship of the above expression (a) is set under the condition that the one end of the seal bead is connected to the one bolt hole and the other end of the seal bead is connected to the other bolt hole. As a result, the seal bead is arranged in its one end at a position which is just below the head seat surface of the fastening bolt, and the seal bead in the one end is directly fastened by the head seat surface of the fastening bolt when the bolt is fastened, and is flattened. Since the flattened position is strongly fastened, a great repulsive force is generated, and a great sealing surface pressure is accordingly generated. Therefore, since a line contact line of the seal bead formed at the other positions than the just below position is directly connected to the flattened position, it is possible to form a seal line which does not disconnect between the bolt holes which are adjacent to each other.

The seal bead may be formed as a half bead which is provided with an inclined surface portion. In this case, the inclined surface portion and the bolt hole are arranged at positions which are lapped over each other on a plane. Further, the seal bead may be formed as a full bead which is provided with a curved surface portion having a circular arc cross sectional shape. In this case, the curved surface portion having the circular arc cross sectional shape and the bolt hole are arranged at positions which are lapped over each other on a plane. Therefore, the metal gasket according to the present invention is constructed as a particular structure in which the inclined surface portion and the curved surface portion having the circular arc cross sectional shape appear on a thickness surface in a peripheral edge portion of the bolt hole.

The metal gasket according to the present invention includes a gasket which is constructed by a metal plate, and a gasket in which a rubber-like elastic body is attached to both surfaces or one surface in a thickness direction of a metal plate (a gasket constructed by a metal plate and a rubber-like elastic body which is attached to the metal plate). The latter gasket in which the rubber-like elastic body is attached to both surfaces of one surface in the thickness direction of the metal plate is characterized by being excellent in an assembling performance (a production cost in a user) and a maintenance performance.

Effect of the Invention

The present invention achieves the following effects.

More specifically, in the present invention, the comparatively great sealing surface pressure is generated at the center portion between the bolt holes of the seal bead which is hard to be deformed, when the bolt is fastened, as described above. As a result, a necessary sealing surface pressure can be secured over a whole length of the seal bead even in the case that the distance between the bolts is long.

Further, the line contact line of the seal bead which is formed at the other positions than the just below position of the head seat surface of the fastening bolt is directly connected to the position which is flattened at the just below position of the head seat surface of the fastening bolt. As a result, a seal line which does not disconnect can be formed. Therefore, since the seal bead is not necessarily provided around the bolt hole as is different from the prior art (FIGS. 11 and 12), it is possible to respond to the request for narrowing the width of the seal surface.

BRIEF EXPLANATION OF THE DRAWINGS

FIGS. 2A to 2C are enlarged cross sectional views of a substantial portion of the metal gasket, in which

FIGS. 3A and 3B are cross sectional views of a substantial portion and show an installed state of the metal gasket, in which

FIGS. 6A and 6B are cross sectional views of a substantial part and show an installed state of a metal gasket according to the other embodiment of the present invention, in which

DETAILED DESCRIPTION OF PREFERRED EMBODIMENTS

The following embodiments are included in the present invention.

(1) The present invention relates to a metal gasket, and more particularly relates to a metal gasket which can correspond to a low rigidity flange and is provided with a gradually changing seal bead concaved for a bolt hole.

(2) Structure (2-1) A metal gasket in which a wide seal bead (a seal bead rising portion) gradually changed to a bolt hole of the metal gasket is concaved into a bolt hole diameter d in relation to a low rigidity flange, and an amount of compression of the seal bead can be increased at the center between the bolts.

(2-2) A metal gasket characterized by a seal bead shape in which a width W1 of the wide seal bead concaved into the bolt hole d is necessarily equal to or less than the bolt hole diameter d.

(2-3) The width W1 of the wide seal bead is equal to or less than a bolt seat surface diameter D (D>d≥W1), thereby obtaining application of a flange rigidity increase in a bolt seat surface height, and aiming at establishment of a sealing performance caused by a seal bead complete compression (a plane contact) in the portion just below the bolt.

(2-4) Aiming at reduction of an axial force loss in the portion just below the bolt by making the seal bead wide (aiming at increase of an amount of compression of the bead at the center portion between the bolts on the basis of the reduction of the axial force loss, which has the same design idea as that of the gradually changing seal bead. D≥W1>W2).

(2-5) The metal plate employs, for example, a stainless steel, a cold-rolled steel plate, a galvanized steel plate, and an aluminum laminated plate. The rubber-like elastic body employs, for example, a synthetic rubber sheet (including an expanded rubber) containing at least one of a nitrile rubber, a styrene butadiene rubber, a fluorine rubber, an acrylic rubber, and a silicone rubber.

(2-6) A shape in which the wide seal bead (the seal bead rising portion) gradually changed to the bolt hole of the metal gasket is concaved into the bolt hole diameter d of the metal gasket in both of the half bead and the full bead (d≥W1>W2).

(2-7) The seal line is prevented from being disconnected by connecting the seal bead contact line to the portion which comes into plane contact with the portion just below the bolt.

(3) Effect (3-1) The seal product can be narrowed, and the flange can be weight saved (=the fuel consumption can be improved).

(3-2) The amount of compression of the seal bead at the center portion between the bolts (the seal weak position) can be increased by the correspondence to the low rigidity flange.

(3-3) It is possible to apply to a case that any design space for passing the seal bead is not provided at the portion just below the bolt.

Embodiments

Next, a description will be given of embodiments according to the present invention with reference to the accompanying drawings.

Figure 1:
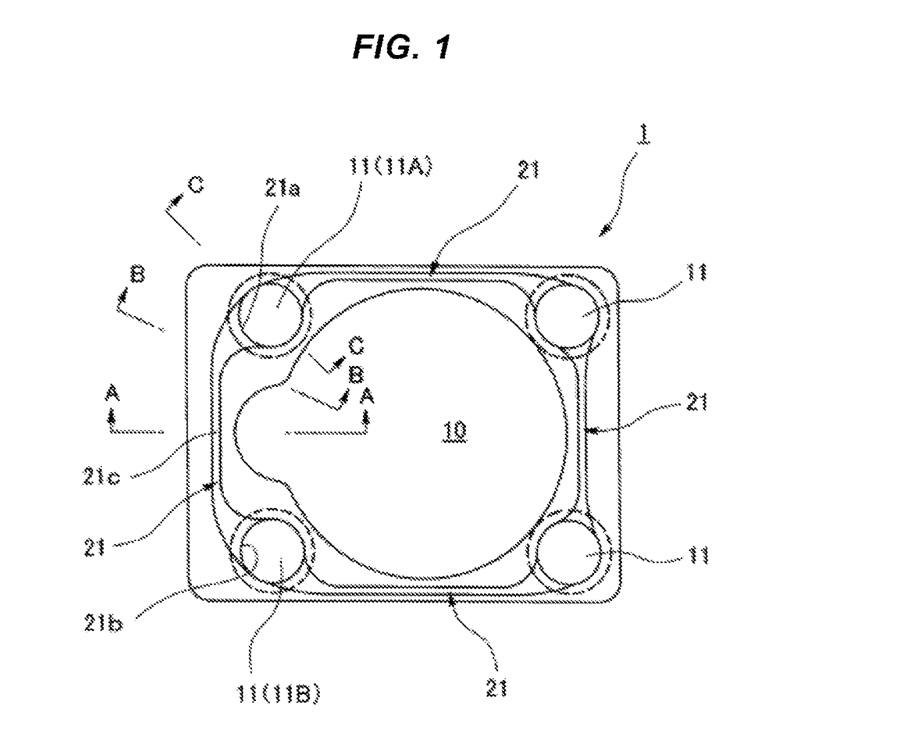
FIG. 1 is a plan view of a metal gasket according to an embodiment of the present invention.
Figure 2A:
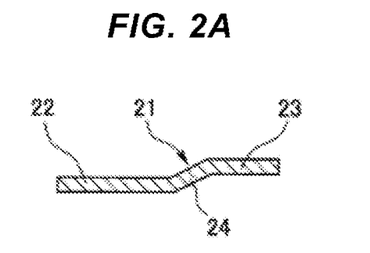
FIG. 2A is an enlarged cross sectional view along a line A-A in FIG. 1.
Figure 2B:
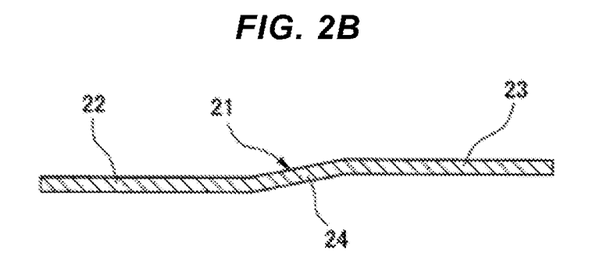
FIG. 2B is an enlarged cross sectional view along a line B-B in FIG. 1.
Figure 2C:
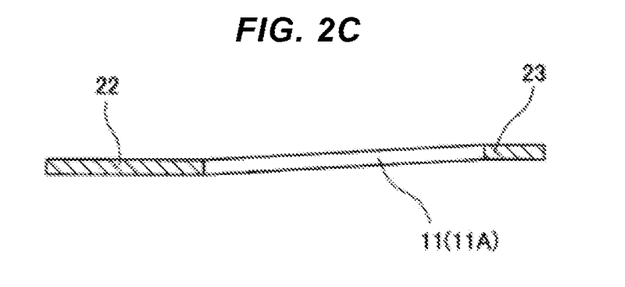
FIG. 2C is an enlarged cross sectional view along a line C-C in FIG. 1.

FIGS. 1 and 2 show a metal gasket 1 according to an embodiment of the present invention. The metal gasket 1 according to the embodiment is a tabular metal gasket installed to a flange portion for an engine or auxiliary machines in a vehicle such as a motor vehicle, or an inverter for an electric vehicle (EV) or a hybrid electric vehicle (HEV), is provided with a predetermined planar layout (a plane longitudinal shape in the drawing), is provided on its plane with a bore hole 10 and a plurality of (four in the drawing) bolt holes 11, and is provided with a seal bead 21 for sealing internal pressure and water (external foreign materials) from an outer side.

As shown in FIG. 1, a plurality of bolt holes 11 are provided on a plane of the metal gasket 1, and a seal bead 21 is provided between the bolt holes 11 which are adjacent to each other. In the drawing, four bolt holes 11 are provided, and each one seal bead 21 is provided between the bolt holes 11 which are adjacent to each other, that is, four seal beads 21 are respectively provided between four sets of adjacent bolt holes 11. However, since the structure overlaps in each of the sets, a description will be given of only one set.

In FIG. 1, the seal bead 21 is provided between the bolt holes which are denoted by reference symbol 11A and 11B and are adjacent to each other. The seal bead 21 is provided in such a manner as to be connected to one bolt hole 11A in one end portion 21a in a longitudinal direction and be connected to the other bolt hole 11B in the other end portion 21b. Further, the seal bead 21 is provided as a bead having a gradually changing shape in which a bead width is the narrowest at a center portion 21c between the bolt holes and the bead width is gradually enlarged from the center portion 22c between the bolt holes toward each of the bolt holes 11A and 11B. Further, the seal bead 21 is provided as a half bead which is provided with an inclined surface portion 24 having a linear cross sectional shape between flat surface portions 22 and 23 having different heights, as shown in FIG. 2. The height of the seal bead 21 is constant over a whole periphery.

Figure 3A:
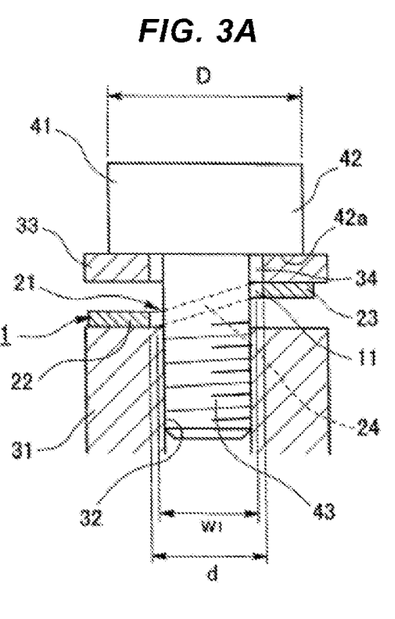
FIG. 3A is a cross sectional view at a position where a bolt hole is provided.
Figure 3B:
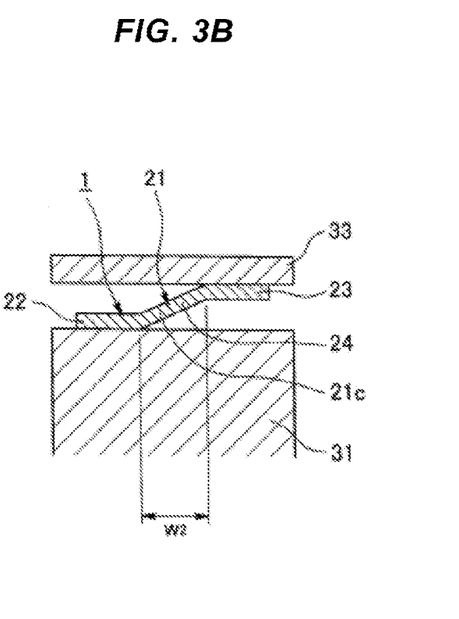
FIG. 3B is a cross sectional view at the center portion between the bolt holes.

FIG. 3 schematically shows a state just before the metal gasket 1 having the structure mentioned above is fastened by fastening bolts 41 after the metal gasket 1 is installed between a casing flange portion (a low rigidity flange) 31 and a cover 33 (a low rigidity cover).

The fastening bolt 41 is integrally provided with a head portion 42 and a thread portion 43. The thread portion 43 is inserted into a bolt insertion hole 34 which is provided in a cover 33 and the bolt hole 11 which is provided in the metal gasket 1, is threadably engaged with a thread portion 32 which is provided in a casing flange portion 31, and is strongly fastened.

Figure 4:
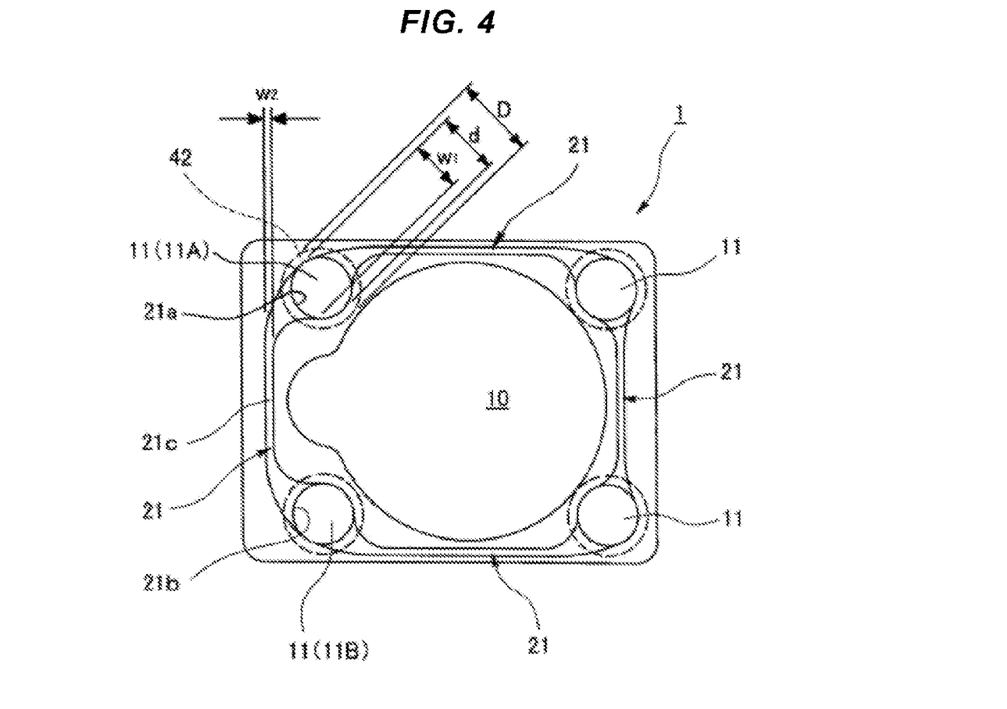
FIG. 4 is an explanatory view showing a size relationship of a dimension in the metal gasket.

Here, dimensions of the portions are set, as shown in FIGS. 3 and 4, to satisfy a relationship expressed by the following expression (a):

$$D > d \geq W1 \tag{a}$$

in which D is a diameter of a seat surface 42a of the head portion 42 of the fastening bolt 41 inserted into the bolt hole 11, d is a diameter of the bolt hole 11, and W1 is a maximum width of the seal bead 21 (a bead width in a peripheral edge portion of the bolt hole 11).

Further, the dimensions are set, as mentioned above, to satisfy a relationship expressed by the following expression (b):

$$W1 > W2 \tag{b}$$

in which W2 is a minimum width of the seal bead 21 (a bead width at the center portion 21c between the bolt holes).

Further, as mentioned above, the seal bead 21 is provided as a half bead which is provided with the inclined surface portion 24, and the inclined surface portion 24 and the bolt hole 11 in the half bead are provided at positions which are different from each other on a plane.

In the metal gasket 1 having the structure mentioned above, the seal bead 21 is provided between the bolt holes 11A and 11B which are adjacent to each other, and the seal bead 21 is provided in such a manner as to be connected to one bolt hole 11A in one end portion 21a in the longitudinal direction and be connected to the other bolt hole 11B in the other end portion 21b. Further, the seal bead 21 is provided as the bead having the gradually changing shape in which the seal bead width is the narrowest at the center portion 21c between the bolt holes and the seal bead width is gradually enlarged from the center portion 22c between the bolt holes toward the bolt holes 11A and 11B. As a result, the seal bead 21 is formed into such a shape that is most hard to be deformed at the center portion 21c between the bolt holes, and is easy to be deformed gradually from the center portion 21c between the bolt holes toward the bolt holes 11A and 11B. Therefore, a comparatively great sealing surface pressure is generated in the center portion 21c between the bolt holes which is hard to be deformed, when the bolt is fastened. Accordingly, it is possible to secure a necessary sealing surface pressure over a whole periphery even in the case that the distance between the bolts is long.

Figure 5:
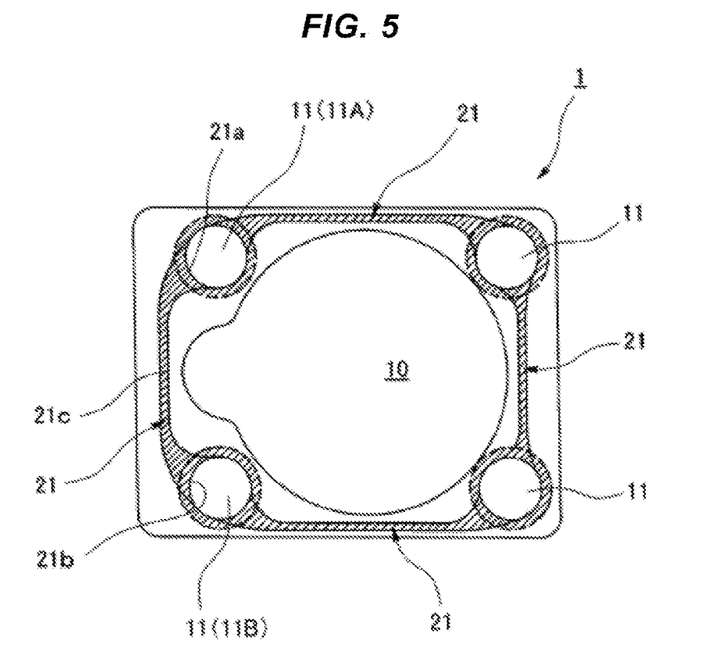
FIG. 5 is an explanatory view showing a state in which a seal line is formed in the metal gasket.

Further, the relationship of the above expression (a) is set under the condition that the one end portion 21a in the longitudinal direction of the seal bead 21 is connected to the one bolt hole 11A and the other end portion 21b of the seal bead 21 is connected to the other bolt hole 11B. As a result, the seal bead 21 is arranged in its one end at a position which is just below the head seat surface 42a of the fastening bolt 41. The seal bead in the one end is directly fastened by the head seat surface 42a of the fastening bolt 41 when the bolt is fastened, and is flattened, a great repulsive force is generated at the flattened position, and a great sealing surface pressure is accordingly generated. Therefore, since the flattened position is directly connected to a line contact line of the seal bead 21 which is formed at the other positions than the just below position, it is possible to form a seal line which does not disconnect between the bolt holes 11A and 11B which are adjacent to each other, as shown by a hatched line in FIG. 5. As a result, since the seal bead is not necessarily provided around the bolt hole as is different from the prior art (FIGS. 11 and 12), it is possible to respond to the request for narrowing the width of the seal surface.

Figure 6A:
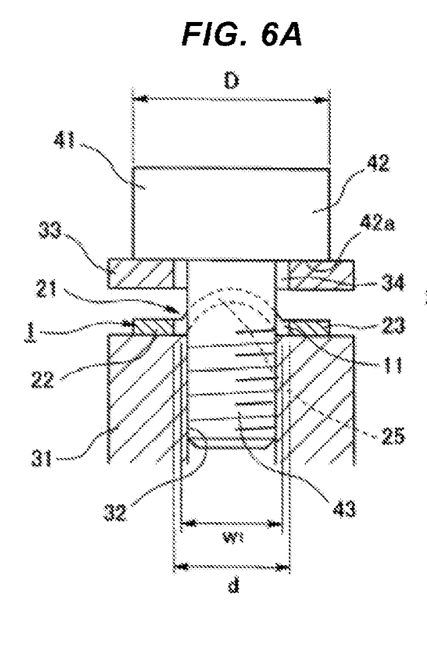
FIG. 6A is a cross sectional view at a position where a bolt hole is provided.
Figure 6B:
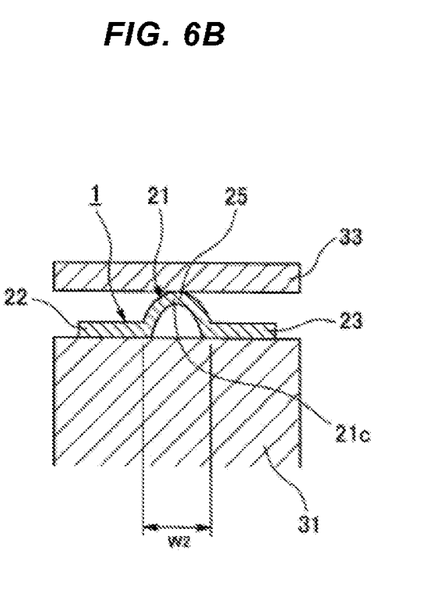
FIG. 6B is a cross sectional view at the center portion between the bolt holes.
Figure 7:
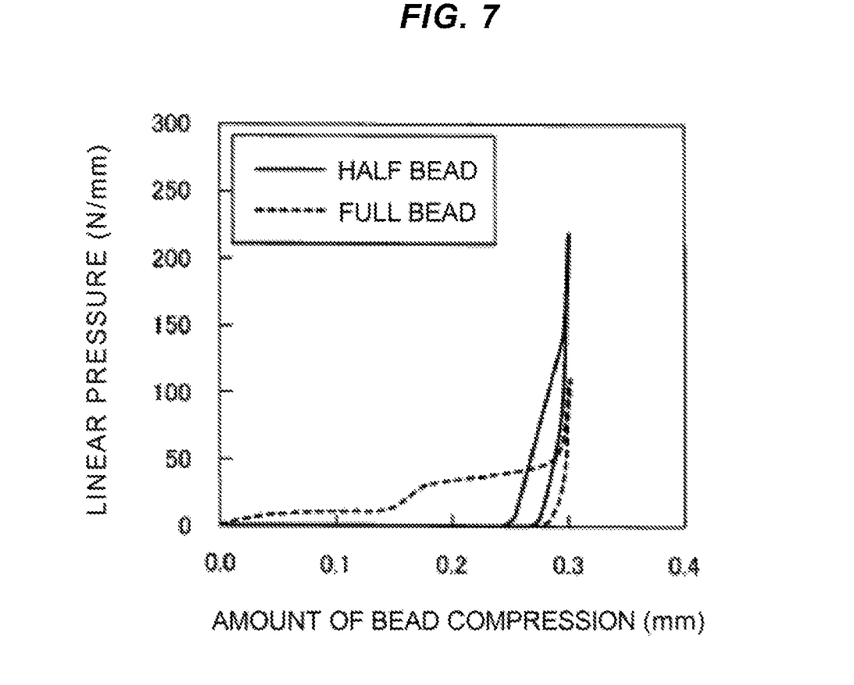
FIG. 7 is a graph showing a relationship between an amount of bead compression and a linear pressure in a half bead and a full bead.

In the embodiment mentioned above, the seal bead 21 is formed as the half bead, however, the seal bead 21 may be formed as a full bead. In an example shown in FIG. 6, the seal bead 21 is formed as a full bead having a curved surface portion 25, and the curved surface portion 25 having a circular arc cross sectional shape is lapped on a plane over the bolts holes 11A and 11B. The full bead is structured such that the curved surface portion 25 having the circular arc cross sectional shape is provided between flat surface portions 22 and 23 having the same height. The half bead and the full bead are different in their properties as shown in FIG. 7.

Figure 8:
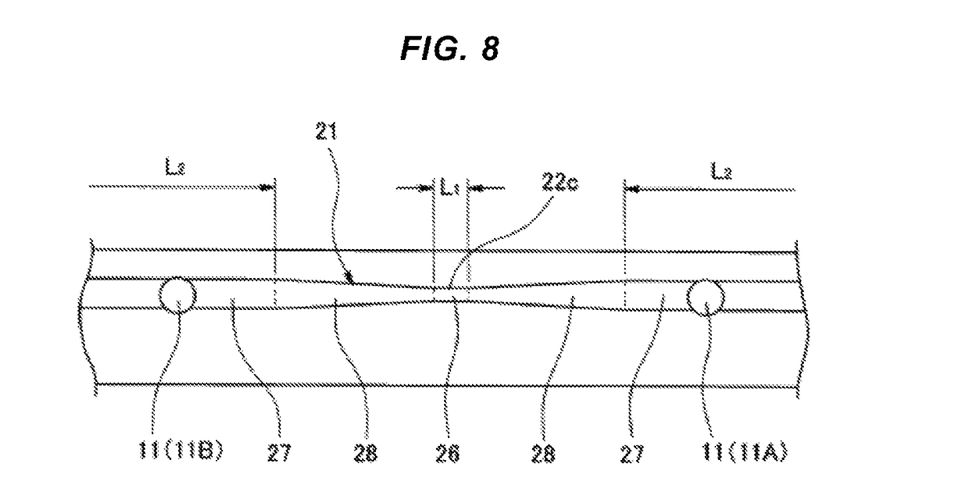
FIG. 8 is a partly plan view of a metal gasket according to the other embodiment of the present invention.

Further, the seal bead 21 may be provided with a certain degree of length in a seal bead longitudinal direction at each of a position where the seal bead width is the narrowest and a position where the seal bead width is the widest. In this case, the seal bead 21 is provided with a narrow seal bead portion 26 which is provided with a predetermined length L1, a wide seal bead portion 27 which is provided with a predetermined length L2, and a gradually changing seal bead portion 28 in which the seal bead width is gradually enlarged from the narrow seal bead portion 26 to the wide seal bead portion 27, for example, as shown in FIG. 8. Among them, the wide seal bead portion 27 is lapped on a plane over the bolt holes 11A and 11B. In addition, the seal bead is set in such a manner that the relationship of the above expression (a) is established.

Figure 9:
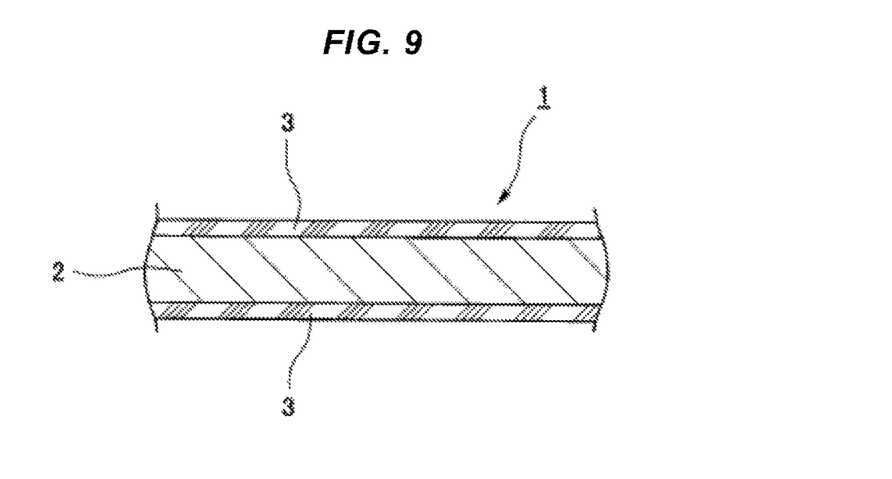
FIG. 9 is an explanatory view showing a laminated structure of a metal gasket according to an embodiment of the present invention.

Further, the metal gasket 1 may be a gasket which is constructed only by a metal plate, however, is constructed in the embodiment as a gasket (SOFT METAL GASKET (brand name)) in which the rubber-like elastic body 3 is attached (coated) on both surfaces or one surface (both surfaces in the drawing) in a thickness direction of the metal plate 2, as shown in FIG. 9.

What is claimed is:

1. A metal gasket having a plurality of bolt holes and formed into a tabular shape,
   wherein a seal bead is provided between bolt holes which are adjacent to each other,
   wherein one end of said seal bead is directly connected to the one bolt hole and the other end of the seal bead is directly connected to the other bolt hole,
   wherein said seal bead is formed into a gradually changing shape in which a width is the narrowest at the center portion between the bolt holes and the width is gradually enlarged from said center portion between the bolt holes toward said bolt holes, and
   wherein said seal bead satisfies the following expression (a):

$$D > d \geq W1$$

in which D is a diameter of a head seat surface of a fastening bolt which is inserted into said bolt hole, d is a diameter of said bolt hole, and W1 is the maximum width of said seal bead.

2. The metal gasket according to claim 1, wherein said seal bead is a half bead which is provided with an inclined surface portion, and
   wherein said inclined surface portion and said bolt hole are provided at positions which are lapped over each other on a plane.

3. The metal gasket according to claim 2, wherein the metal gasket is a gasket which is constructed by a metal plate, or a gasket in which a rubber-like elastic body is attached to both surfaces or one surface in a thickness direction of a metal plate.

4. The metal gasket according to claim 1, wherein said seal bead is a full bead which is provided with a curved surface portion having a circular arc cross sectional shape, and
   wherein said curved surface portion having the circular arc cross sectional shape and said bolt hole are provided at positions which are lapped over each other on a plane.

5. The metal gasket according to claim 4, wherein the metal gasket is a gasket which is constructed by a metal plate, or a gasket in which a rubber-like elastic body is attached to both surfaces or one surface in a thickness direction of a metal plate.

6. The metal gasket according to claim 1, wherein the metal gasket is a gasket which is constructed by a metal plate, or a gasket in which a rubber-like elastic body is attached to both surfaces or one surface in a thickness direction of a metal plate.

* * * * *